United States Patent
Yang

(10) Patent No.: US 6,362,610 B1
(45) Date of Patent: Mar. 26, 2002

(54) UNIVERSAL USB POWER SUPPLY UNIT

(76) Inventor: Fu-I Yang, 5th Floor, 101, Hsin Pu 8th Street, Tao-Yuan City (TW)

( * ) Notice: Subject to any disclaimer, the term of this patent is extended or adjusted under 35 U.S.C. 154(b) by 0 days.

(21) Appl. No.: 09/928,685

(22) Filed: Aug. 14, 2001

(51) Int. Cl.$^7$ .............................................. G05F 1/40
(52) U.S. Cl. ..................................................... 323/281
(58) Field of Search ................................. 323/268, 270, 323/273, 281; 363/144, 146, 147

(56) References Cited

U.S. PATENT DOCUMENTS

| | | | | |
|---|---|---|---|---|
| 6,125,455 A | * | 9/2000 | Yeo .............................. | 714/14 |
| 6,211,649 B1 | * | 4/2001 | Matsuda ...................... | 320/115 |
| 6,255,800 B1 | * | 7/2001 | Bork ........................... | 320/115 |
| 6,308,215 B1 | * | 10/2001 | Kollbet et al. .............. | 709/233 |

* cited by examiner

Primary Examiner—Matthew Nguyen
(74) Attorney, Agent, or Firm—Rosenberg, Klein & Lee

(57) ABSTRACT

The present invention relates to a includes a USB port connector and a charging connector. The USB port connector is used to plug into the jack of the USB port while the charging connector is used to plug into the jack of the electronic products to be charged. The current flowing into the USB port connector will then pass through an automatic voltage regulator. Disposed within a housing of the automatic voltage regulator is a DC voltage transformer which transforms the DC voltage (5V) coming from the USB port to the required voltage supplied to a power/signal connecting jack. Provided within the DC voltage transformer is furthermore a feedback control voltage output circuit which compares the feedback voltage signal of the power/signal connecting jack and enable the DC voltage transformer to output a preset voltage. The charging connector is fitted with a power cord which includes a power/signal connecting connector to fit the power/signal connecting jack. Moreover, a required voltage parameter is preset within the charging connector.

1 Claim, 6 Drawing Sheets

UNIVERSAL USB POWER SUPPLY UNIT

BACKGROUND OF THE INVENTION

1. Field of the Invention

The present invention relates to a universal USB power supply unit, and more particularly, to a power supply unit utilizing the DC power supplied through the universal serial bus (USB) port by means of a feedback control voltage output circuit for use of PDAs, game machines, walkmans, etc.

2. Description of the Prior Art

The photoelectric, communication and digital technology have been rapidly developed so that PDAs, digital cameras, mini CD-ROMs, game machines and mobile phones have been very popular in the everyday life. Besides, the volume thereof becomes smaller and smaller to facilitate carrying so that they have been regarded as necessities of everyday life. However, when the battery runs down, it has to be recharged for further use. Moreover, the charger of each product requires different voltage. For example, the charging voltages of the mobile phones of Motorola, Nokia, Ericsson and Panasonic are different. Some need direct current of 4.2V and the others need 4.5V. And the other products like PDAs or digital cameras have the same problems as well.

When the user of these products goes on a (business) trip, a certain adapter and charger have to be taken with him for charging. However, to carry these accessories is very inconvenient. Moreover, different mains sockets are used in different countries so that special connectors are necessary, thereby resulting in much difficulty.

Now, the use of the computer is very popular, and most of the current computers have USB port which features 5V voltage output. Moreover, the specification of the output interface of most computers is identical. Particularly, the USB port of the laptop computer becomes a necessary accessory. In addition, USB port includes its own protection and voltage-stabilizing circuit. How to utilize the laptop computer to supply power is the main topic of the present invention.

The commercially available charging cable (A), as shown in FIG. 1, includes a USB port connector 1 at one end thereof while the other end thereof has a charging connector 2. In use, both ends of the charging cable (A) are respectively connected to the mobile phone and the computer for charging the battery of the mobile phone (M). However, the output voltage of the USB port is 5V DC voltage, and the required charging voltage of most mobile phones are different. Some of them even have difference of few volts. Accordingly, a harmful influence upon the charging effect and the battery life will be created when all kinds of batteries of the mobile phones are charged with the 5V voltage.

In order to remove the above-mentioned drawbacks, another charging cable (B), as shown in FIG. 2, includes a DC transformer 3 between the USB port connector 1 and the charging connector 2 in order to transform the 5V output voltage of the USB port to the charging voltage (for example: 3.8V) of the battery of the mobile phone (M). Though this supplies the constant required voltage to the mobile phone for charging, the charging cable (B) can be used for only one model of mobile phone, and is not applicable to another mobile phones or electronic products. In addition, the old models of the mobile phones are eliminated very fast. When the old mobile phone is replaced with a new one, a new charging cable (B) is necessary, thereby causing unnecessary waste. Besides, the same company produces different models of mobile phones so that charging cables (B) with different output voltage are necessary. Both connectors of the charging cable (B) has simple configuration and is cheap while the integrated circuit and electronic components inside of the DC transformer 3 are expensive. When the whole charging cable (B) is often replaced, it doesn't meet the economic efficiency.

Furthermore, when the power source from the laptop computer is used to charge the batteries of the portable PDAs, digital cameras, etc., another charging cables are required. Generally, the charging voltages thereof are different. Therefore, it's still impractical to utilize the USB port to charge the batteries of the portable PDAs, digital cameras, etc.

SUMMARY OF THE INVENTION

It is a primary object of the present invention to provide a universal USB power supply unit which can be utilized to offer different output voltages in accordance with different products for reaching the multifunctional effect. It is another object of the present invention to provide a universal USB power supply unit which is convenient to carry and easy to connect.

BRIEF DESCRIPTION OF THE DRAWINGS

The accomplishment of this and other objects of the invention will become apparent from the following description and its accompanying drawings of which.

DETAILED DESCRIPTION OF THE PREFERRED EMBODIMENT

Figure 1:
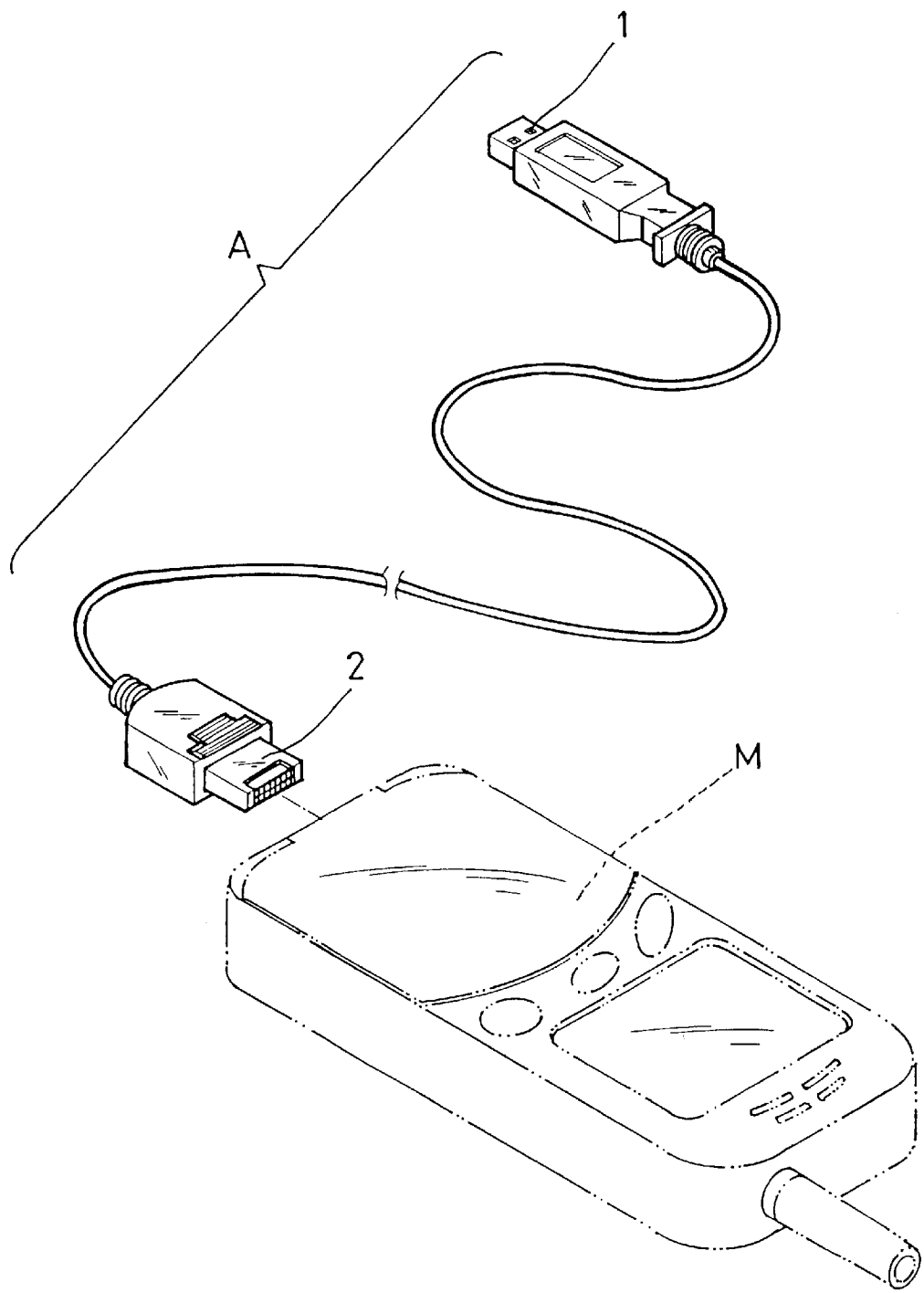
FIG. 1 is a perspective view of a conventional USB adapter cable.
Figure 2:
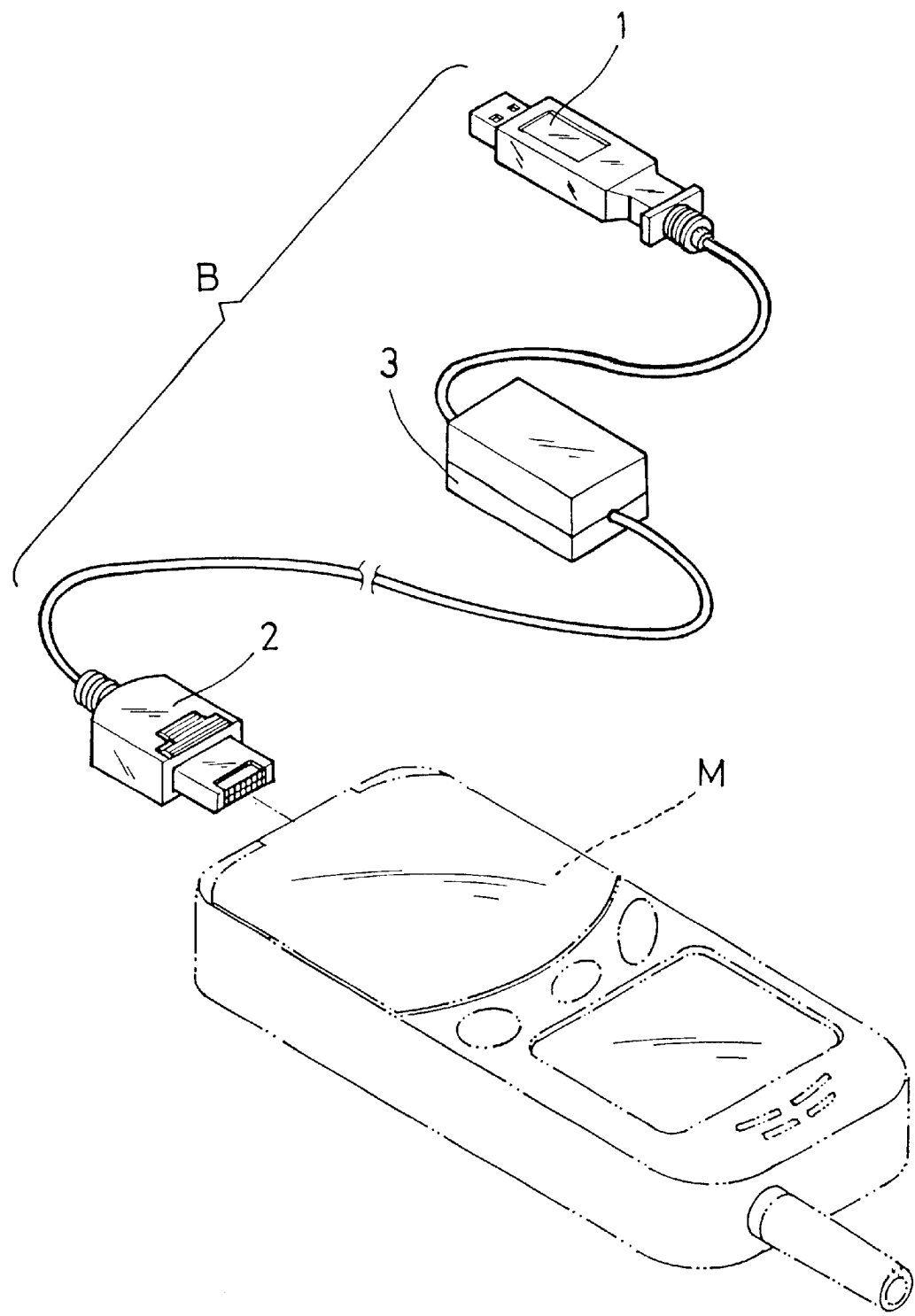
FIG. 2 is a perspective view of another conventional USB adapter cable.
Figure 3:
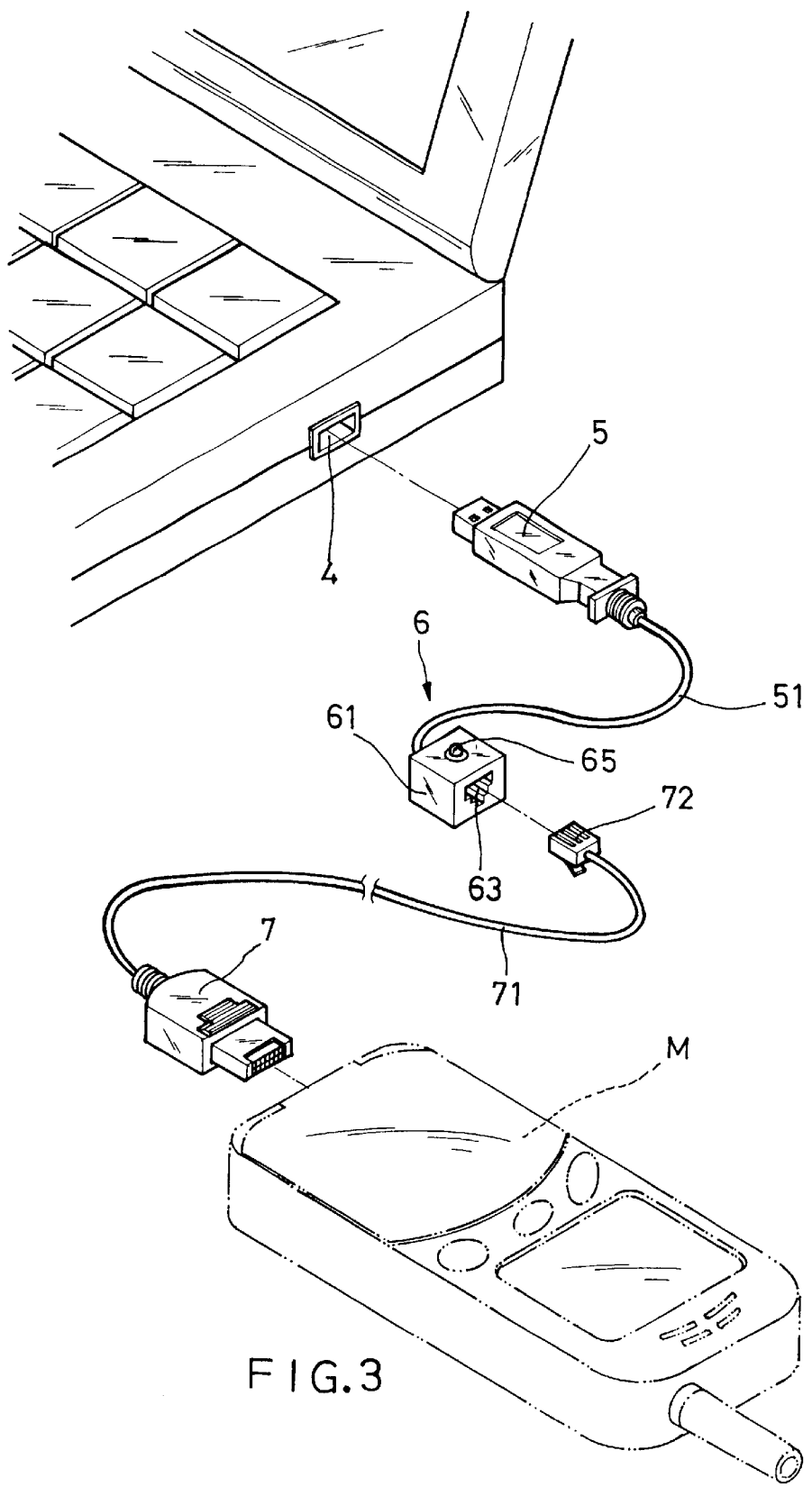
FIG. 3 is a perspective view of an applicable embodiment of the present invention.
Figure 4:
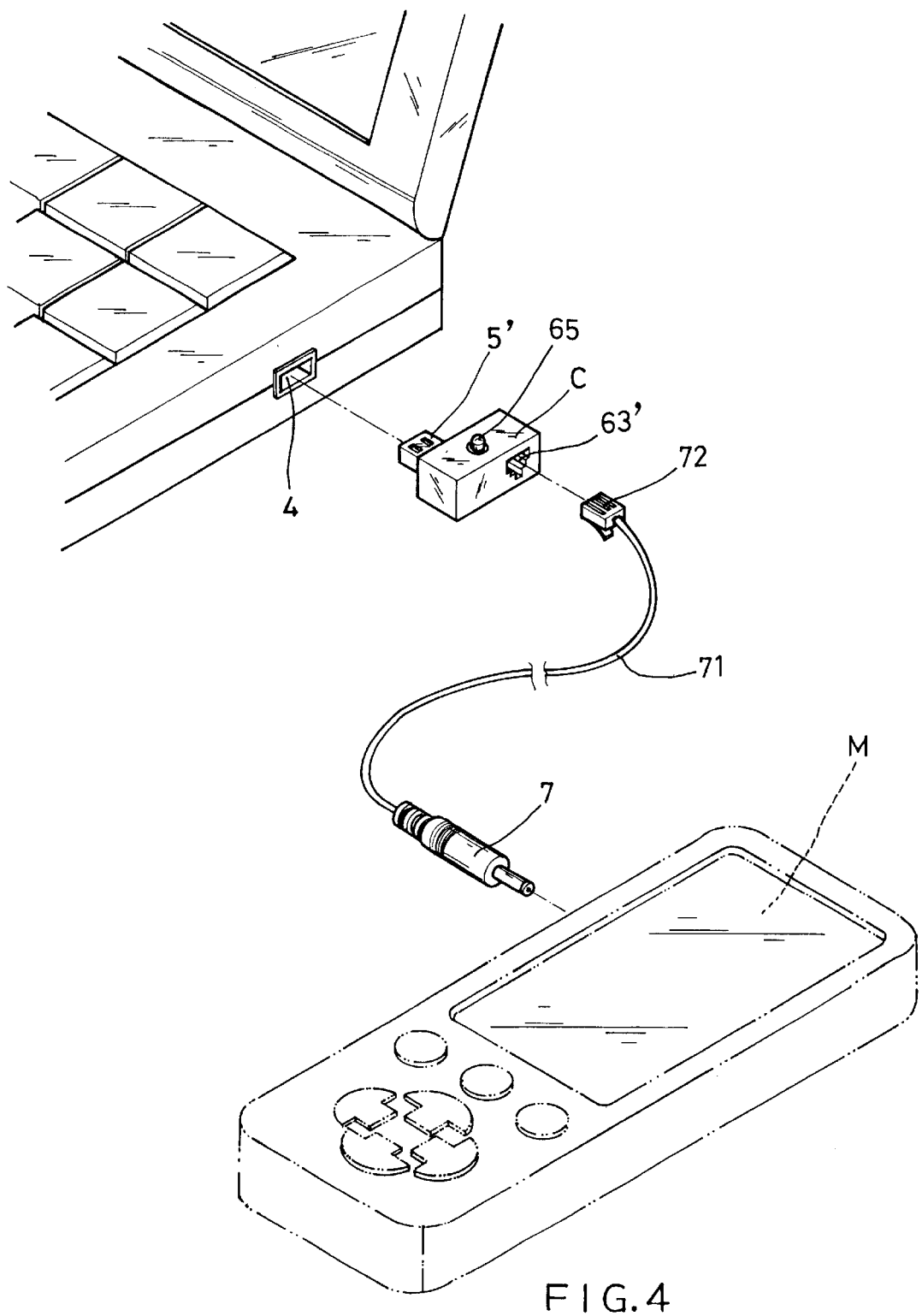
FIG. 4 is a perspective view of another applicable embodiment of the present invention.
Figure 5:
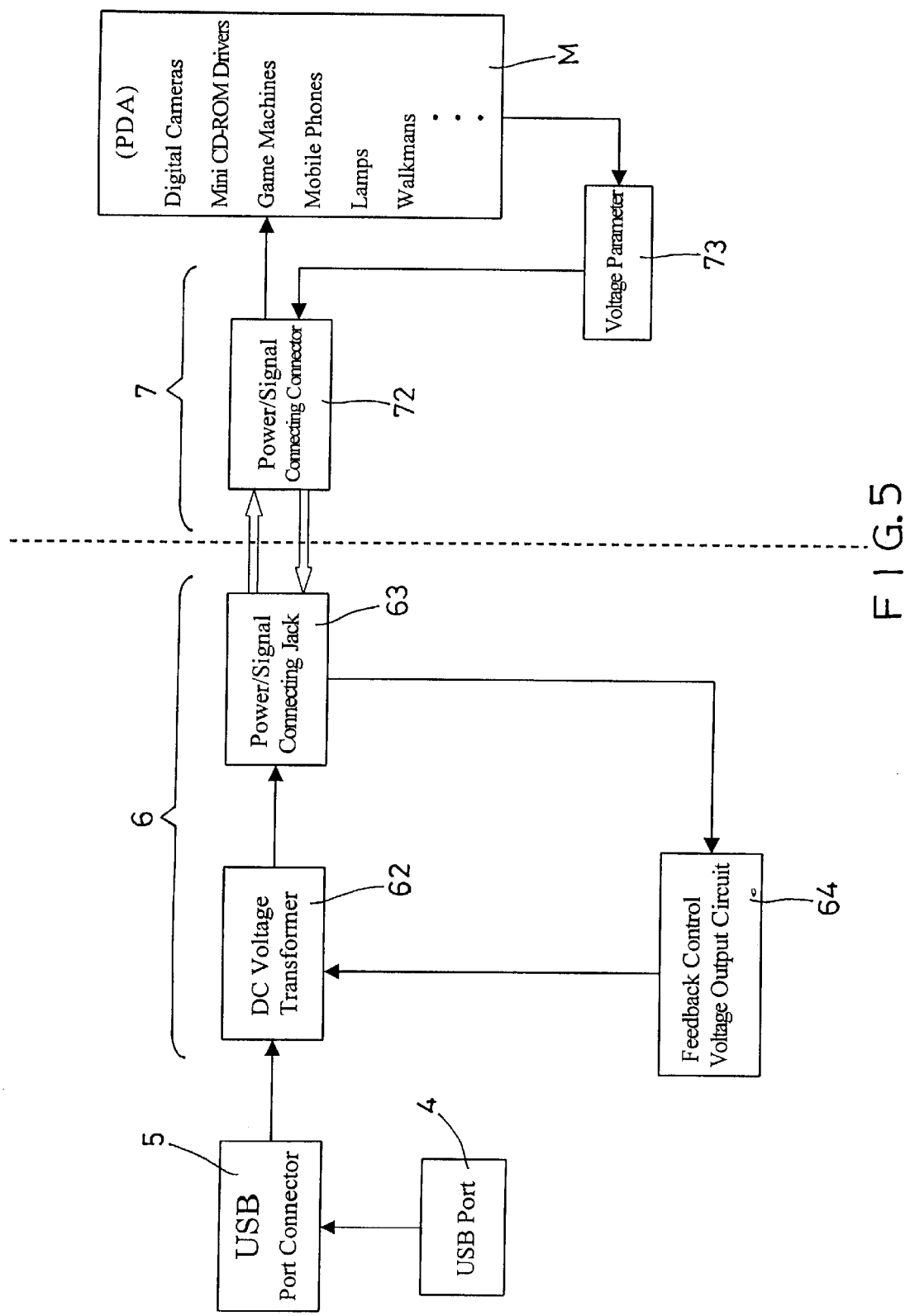
FIG. 5 is a block diagram showing the main structure of the present invention.

First of all, referring to FIGS. 3 through 5, the universal USB power supply unit of the present invention includes a USB port connector 5 and a charging connector 7. The USB port connector 5 is used to plug into the jack of the USB port while the charging connector 7 is used to plug into the jack of the electronic products to be charged.

The current flowing into the USB port connector 5 will then pass through an automatic voltage regulator 6. Disposed within a housing 61 of the automatic voltage regulator 6 is a DC voltage transformer 62 which transforms the DC voltage (5V) coming from the USB port 4 to the required voltage supplied to a power/signal connecting jack 63. Provided within the DC voltage transformer 62 is furthermore a feedback control voltage output circuit 64 which compares the feedback voltage signal of the power/signal connecting jack 63 and enables the DC voltage transformer 62 to output a preset voltage.

The charging connector 7 is fitted with a power cord 71 which includes a power/signal connecting connector 72 to fit the power/signal connecting jack 63 so that an electric connection is enabled. Moreover, a required voltage parameter 73 is preset within the charging connector 7.

The USB port connector 5 and the automatic voltage regulator 6, as shown in FIG. 3, are two independent housings and connected to each other by a connecting cord 51. In addition, a light-emitting diode (LED) is disposed on the housing 61 of the automatic voltage regulator 6 for showing the connection state.

Furthermore, the USB port connector 5 and the housing 61 of the automatic voltage regulator 6, as shown in FIG. 4, are combined in a box (C) which includes a projecting USB port connector 5' at one side thereof to plug into the USB port 4 and a power/signal connecting jack 63' at the opposite side thereof. Accordingly, the universal USB power supply unit is much easier for carrying and using.

Figure 6:
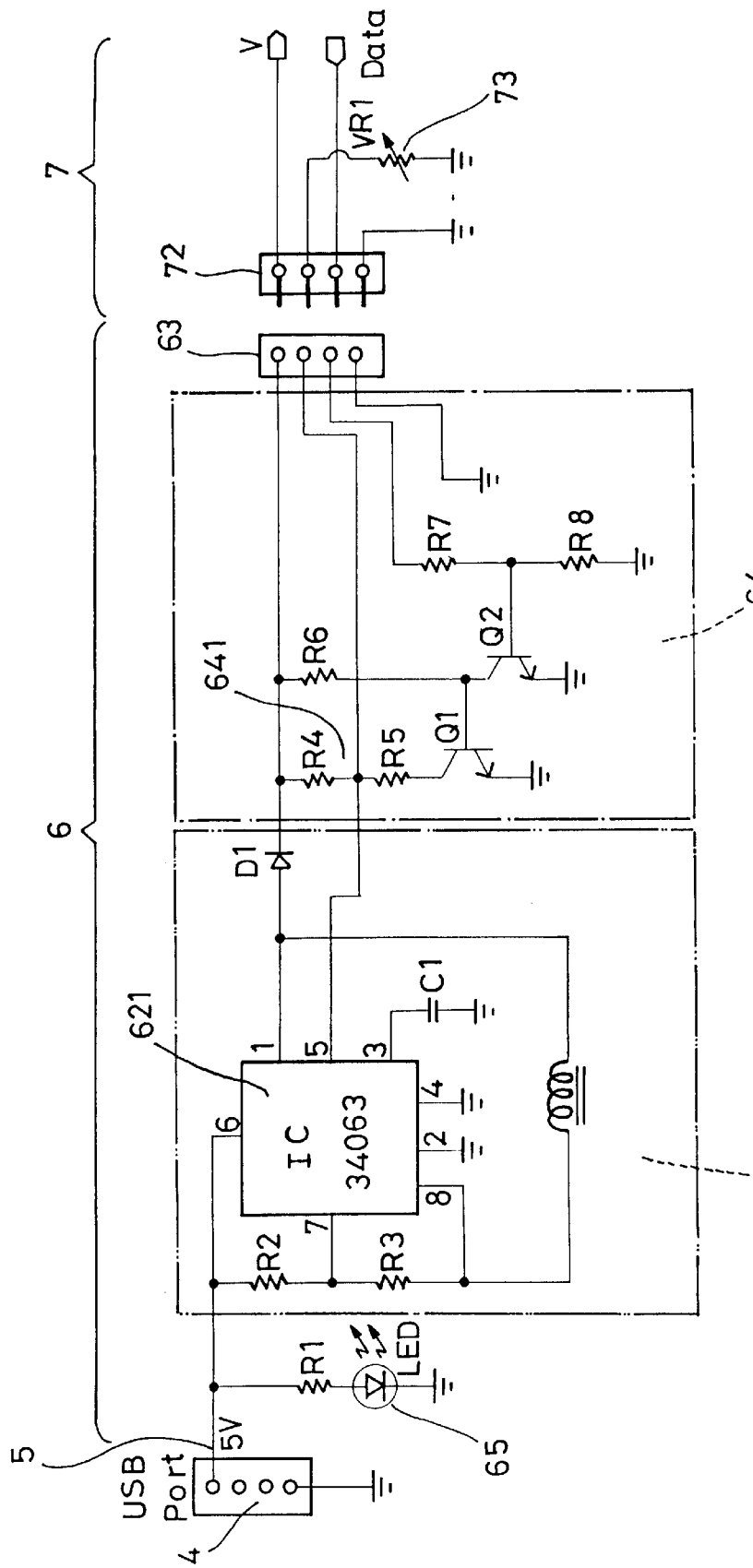
FIG. 6 is a circuit diagram of the present invention.

The automatic voltage regulator 6 of the present invention, as shown in FIG. 6, utilizes the DC voltage transformer 62 to regulate the output voltage of the direct current with 5V voltage coming from the USB port 4. The DC voltage transformer 62 mainly includes a voltage stabilizing integrated circuit 621 with the model number of 34063 whose sixth connecting pin is connected with the USB port connector 5m while the stabilized voltage is connected to the power/signal connecting jack 63 through the first and fifth connecting pins. Additionally, the voltage stabilizing integrated circuit 621 is also connected with an inductance (L1), a capacitance (C1), two resistors (R2, R3) and a diode (D1) all of which serve as current limit and oscillation circuit.

The feedback control voltage output circuit 64 extends between the DC voltage transformer 62 and the power/signal connecting jack 63, and includes two power transistors (Q1, Q2) and four resistors (R4~R8). The resistors (R4, R5) serve as voltage-dividing points 641 for controlling the output voltage. The charging connector 7 utilizes a variable resistor (VR1) as voltage parameter 73. When the power/signal connecting connector 72 and the power/signal connecting jack 63 are in connection, the required voltage parameter 73 will be fed back by the fifth connecting point through the voltage-dividing points 641 of the resistors (R4, R5) to the voltage stabilizing integrated circuit 621; thereafter, the inductance (L1) is controlled by the voltage stabilizing integrated circuit 621 to adjust the output voltage in such a way that the charging voltage supplied to the charging connector 7 corresponds to the voltage required by the product to be charged.

Based on the aforementioned, further descriptions are given as follows to summarize the improved effects of the present invention:

1. The voltage parameter will be fed back by the charging connector 7 after the output voltage (5V) of the computer USB port 4 passes through the automatic voltage regulator 6. Therefore, the output voltage can be controlled to supply to the product (M) to be charged. In addition, the product (M) to be charged will get the most proper charging voltage for reaching the best charging efficiency and for ensuring the service life of the product.

2. Since the specification of the USB port connector 5 won't be changed and the circuit of the automatic voltage regulator 6 is also unchanged, no replacement is necessary. It's only required to use the charging connector 7 of the respective products. If the mobile phone needs the charging voltage of 4.2V, the variable resistor (VR1) built in the charging connector 7 will offer the preset voltage parameter 73 to enable the automatic voltage regulator 6 to output the 4.2V DC voltage. Accordingly, when the user has different products of mobile phone, PDA, digital camera, etc., different kinds of adapters and desktop chargers for different output voltage are unnecessary and only one set of the USB power supply unit is required. Moreover, the charging connector 7 is lightweight and cheap in price, and has been regarded as accessory of many products. Thus, the present invention is very convenient in use and multifunctional to avoid a waste of resources.

Consequently, the present invention takes full advantage of the 5V voltage supplied by the USB port for use of power supply units of portable electronic products so that the efficiency and the convenience thereof can be maximized.

Many changes and modifications in the above-described embodiments of the invention can, of course, be carried out without departing from the scope thereof. Accordingly, to promote the progress in science and the useful arts, the invention is disclosed and is intended to be limited only by the scope of the appended claim.

What is claimed is:

1. A universal serial bus (USB) power supply unit comprising:
   a USB port connector used to plug into the jack of the USB port; and
   a charging connector used to plug into the jack of the electronic products to be charged;
   wherein the current flowing into said USB port connector will then pass through an automatic voltage regulator; and
   wherein said automatic voltage regulator (6) includes:
      a DC voltage transformer (62) transforming the DC voltage (5V) coming from said USB port to the required voltage supplied to a power/signal connecting jack; and
      a feedback control voltage output circuit comparing the feedback voltage signal of said power/signal connecting jack and enabling the DC voltage transformer to output a preset voltage; and
   wherein said charging connector is fitted with a power cord which includes a power/signal connecting connector to fit the power/signal connecting jack so that an electric connection is enabled, and
   wherein a required voltage parameter is preset within the charging connector by means of a variable resistor.

* * * * *